United States Patent
Seidl

(12) 
(10) Patent No.: US 7,147,784 B2
(45) Date of Patent: Dec. 12, 2006

(54) HYDRAULIC OR PNEUMATIC DRIVE SYSTEM, METHOD, AND APPARATUS FOR A FLUID SCREENING SYSTEM

(75) Inventor: Gerald Seidl, Houston, TX (US)

(73) Assignee: Headworks, Inc., Houston, TX (US)

( * ) Notice: Subject to any disclaimer, the term of this patent is extended or adjusted under 35 U.S.C. 154(b) by 286 days.

(21) Appl. No.: 10/864,713

(22) Filed: Jun. 9, 2004

(65) Prior Publication Data
US 2005/0035064 A1    Feb. 17, 2005

Related U.S. Application Data

(60) Provisional application No. 60/494,291, filed on Aug. 11, 2003.

(51) Int. Cl.
*B01D 33/00* (2006.01)

(52) U.S. Cl. ........................ 210/741; 210/159; 210/161

(58) Field of Classification Search ................ 210/741, 210/161, 162, 159
See application file for complete search history.

(56) References Cited

U.S. PATENT DOCUMENTS

| | | | |
|---|---|---|---|
| 3,199,793 A | 8/1965 | Sabi | |
| 3,659,963 A | 5/1972 | Jennings | |
| 4,227,138 A | 10/1980 | Espelage et al. | |
| 4,508,318 A | 4/1985 | Maeda | |
| 4,799,160 A | 1/1989 | Arbeille et al. | |
| 5,032,263 A * | 7/1991 | Rudzinski | 210/159 |
| 5,730,862 A * | 3/1998 | Mahr | 210/91 |
| 6,190,258 B1 | 2/2001 | Heidenreich et al. | |
| 2004/0245159 A1* | 12/2004 | Rybar et al. | 210/97 |

FOREIGN PATENT DOCUMENTS

| | | |
|---|---|---|
| DE | 3404954 A1 | 2/1984 |
| FR | 2808496 A1 | 5/2000 |

* cited by examiner

*Primary Examiner*—Robert A. Hopkins
(74) *Attorney, Agent, or Firm*—Bracewell & Giuliani LLP

(57) ABSTRACT

A drive system for driving a screen in a fluid screening system comprises a hydraulic or pneumatic motor coupled to a drive shaft of the screen. The system is sized to provide the torque required to drive the screen throughout-the desired speed range, as well as providing additional torque as required to free lodged solids from the screen field. The hydraulic motor provides overload protection when lodged solids block the rotating rake bar. The drive system operates up to a predetermined pressure value before the overload protection is activated. The drive system may be operated in either a manual mode or an automatic mode.

15 Claims, 7 Drawing Sheets

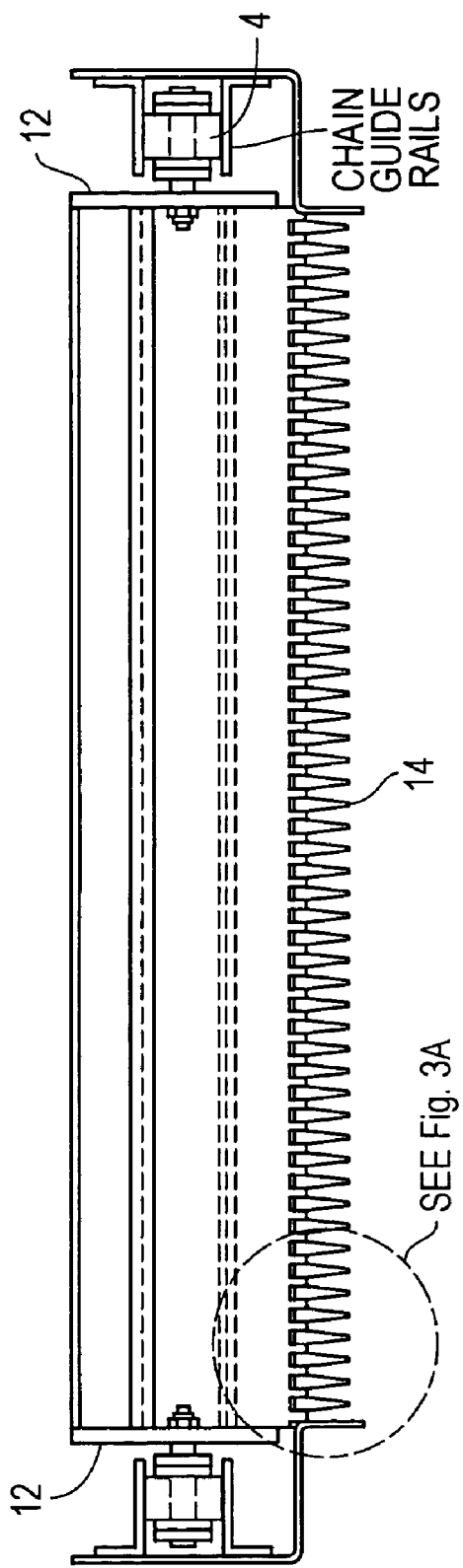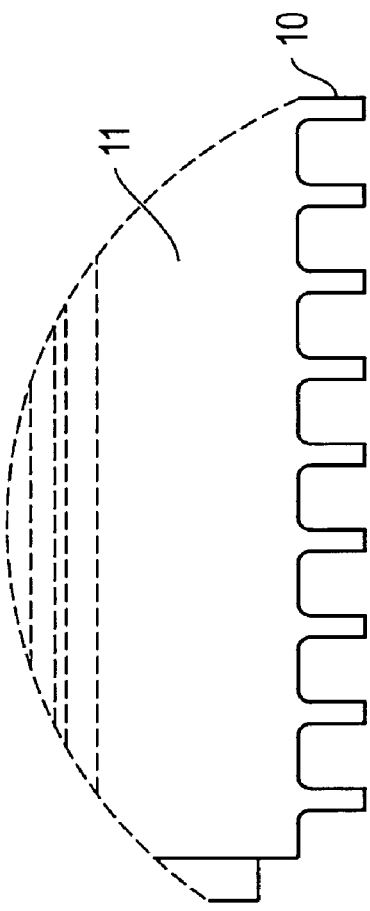
FIG. 3
FIG. 3A

HYDRAULIC OR PNEUMATIC DRIVE SYSTEM, METHOD, AND APPARATUS FOR A FLUID SCREENING SYSTEM

This patent application claims priority to U.S. Provisional Patent Application No. 60/494,291, filed on Aug. 11, 2003, which is incorporated herein by reference.

BACKGROUND OF THE INVENTION

1. Technical Field

The present invention relates in general to an improved drive system in a fluid screening operation and, in particular, to an improved system, method, and apparatus for hydraulically or pneumatically driving a fluid screening system as well as sensing and correcting an overload in the fluid screening system.

2. Background of the Invention

Bar screens are used for screening solids and debris from flowing liquid streams. An example of such a bar screen system can be found in U.S. Pat. No. 5,730,862. In such systems, a series of rakes pass over parallel screen bars, which make up a bar screen field and remove the debris collected from the flowing stream. Occasionally, large pieces of debris can clog and even damage the bar screen field by either bending or breaking one or more bars within the bar screen field. Furthermore, such blockage can cause the fluid to overflow the filter system. When damage does occur, the screen system must be repaired by typically cutting out the affected bars and welding new bars in their place. These repairs are time consuming, potentially hazardous, and expensive. The screen system is typically taken out of service for a relatively long period of time in order to make such repairs, which also adds significantly to the costs of the repairs.

Some prior art systems have tried to address this problem by using nozzles to spray the debris off of the rakes and screen, or either reversing the direction of travel for the rakes until the impediment has been removed from the screen. However, these attempts are not always successful at clearing the screen enough to continue operation of the system, especially when the debris is relatively large size. Thus, a need exists for an improved screen system, and preferably one that can prevent or avoid such extensive damage and repairs. Ideally, such a system should be capable of being adapted to the specific fluid applications and also be able to be used on existing screen system equipment with minimal modification.

SUMMARY OF THE INVENTION

One embodiment of a drive system for driving a rake assembly in a fluid screening system comprises a pneumatic or hydraulic motor coupled to a drive shaft of the rake assembly. The motor and the drive system are sized to provide the torque required to drive the rake assembly throughout the desired speed range. The motor may comprise a variable displacement type that provides constant torque but allows variable speed operation in proportion to the amount of, for example, hydraulic oil flowing through the motor. The drive system provides additional torque as required to free lodged solids from the screen field, and an overload protection when the lodged solids block the rotating rake bar. The drive system operates up to a predetermined pressure value before the overload protection is activated.

The drive system also has a hydraulic fluid reservoir, an electric motor, a suction strainer, a filler/breather, a temperature gauge, and a fluid level gauge. The drive system also includes a variable displacement hydraulic pump having load sensing control, a pressure gauge, a directional control valve for directional control of the rake assembly, a solenoid-controlled flow control module to control the low speed mode of the rake assembly, a pressure regulator for the hydraulic circuit pressure, a pressure switch, and a hydraulic air-to-oil cooler and return filter.

The drive system may be operated in either a manual mode or an automatic mode. In the manual mode, the drive system operates in forward or reverse, and at a low speed or a high speed. If the rake assembly encounters an obstruction that causes high discharge pressure, the drive system stops. In the manual mode, this condition must be manually acknowledged or reset, and then restarted.

In the automatic mode, the hydraulic power unit is energized and the drive system runs forward at a selected speed mode. The drive system runs at the selected speed until a different level input is received. The drive system may run at the high speed mode until the high level input is removed, at which time it slows to the low speed mode until that input is also removed. If an obstruction is encountered and causes high pressure, the rake assembly stops. After an adjustable delay, the rake assembly begins rotating in reverse in the low speed mode. If the obstruction dislodges easily, then, after an adjustable time period, the rake assembly stops and then runs forward again. However, if the obstruction does not dislodge easily, the rake assembly stops once again. These forward/reverse cycles continue until several attempts have been made to clear the obstruction, at which time the drive system shuts down.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 3 is a partial, top plan view of a rake assembly of the present invention;

FIG. 3A is an enlarged view of a portion of the rake assembly;

DETAILED DESCRIPTION OF THE INVENTION

U.S. Pat. No. 5,730,862, assigned to Headworks, Inc., is incorporated herein by reference.

Figure 2:
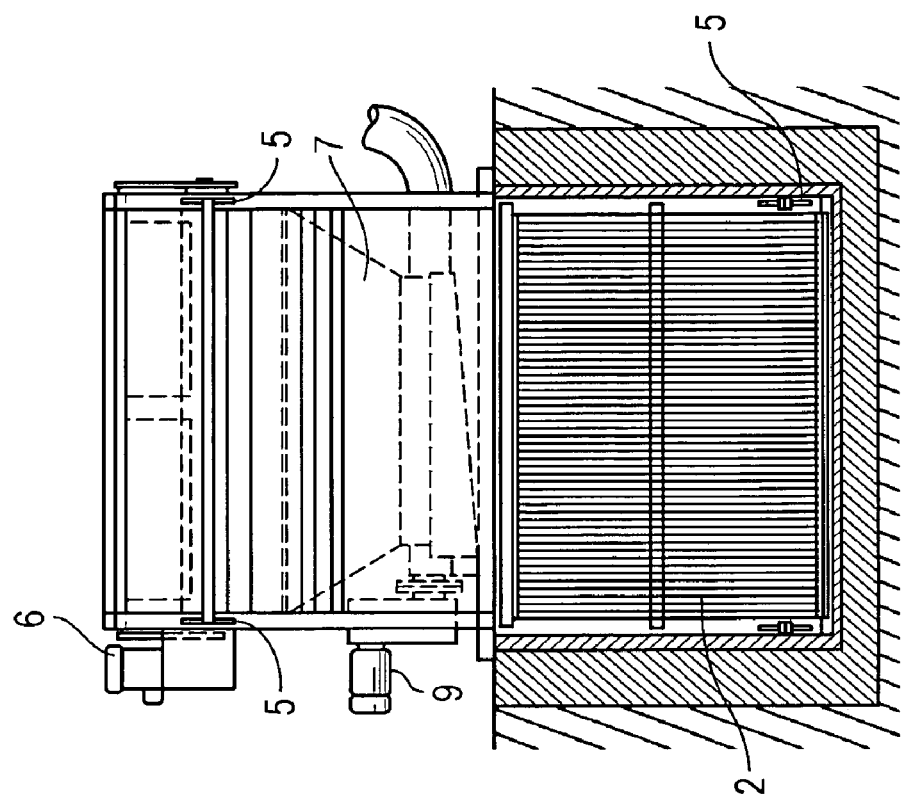
FIG. 2 is a front elevational view thereof.
Figure 1:
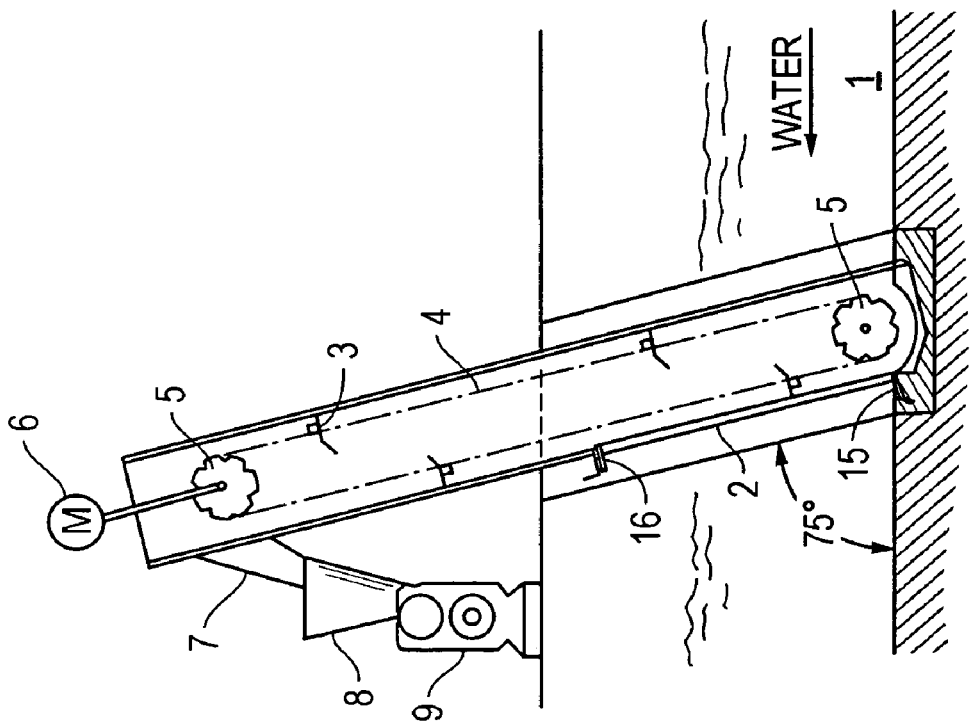
FIG. 1 is a schematic, side elevational view of the bar screen assembly constructed in accordance with the present invention.

Referring now to all of the figures and particularly to FIG. 1, a water channel 1 is shown in which water flows in the direction of the arrow. Solids are collected at a screen 2 and the screenings are raked upwardly from the screen with a plurality of rakes 3. The screen 2 makes an angle of approximately 15 degrees with respect to a vertical line. The rakes 3 are disposed on an endless chain 4 that travels about sprocket wheels 5, which rotate in a clockwise direction. The upper sprocket wheel 5 is driven by a drive system 6, which will be described below in greater detail. The screenings that are raked from the screen 2 are lifted upwardly by a respective rake 3. When the rake 3 reaches a scraper mechanism (FIG. 8), the screenings are brushed from the rake 3 and fall through chutes 7, 8 into a screenings bale press 9. The bale press 9 (e.g., a screw press or a snail press) is used for dewatering the screenings and for reducing the volume of the collected material.

Figure 4:
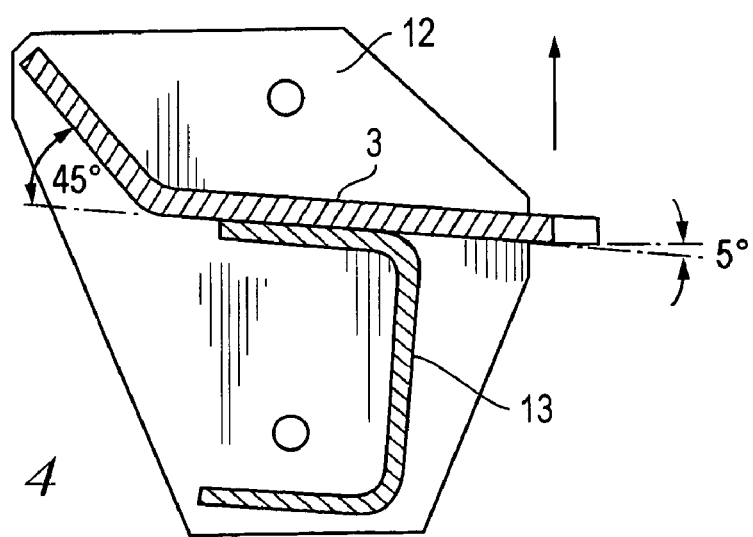
FIG. 4 is a side elevational view thereof.

Referring now to FIG. 3, the rake 3 has a multiplicity of tines 10 that are formed directly from a rake plate 11. Depending on the spacing of the screen 2, the tines 10 have a typical width of between 4 mm and 8 mm. These small measurements make it virtually impossible to attach tines to the rake plate 11 and still obtain the necessary accuracy and rigidity. Accordingly, the tines 10 of this invention are laser or plasma-machined from the rake plate 11, with a plasma cutter, a water cutter, or still other means. Either side of the rake 3 is attached to the side walls or rake cheeks 12. The chain 4 travels in chain guide rails. In order to obtain the required accuracy, the chain 4 should be a precision transport chain. As shown in FIG. 4, the rake plate 11 is profiled such that it forms an upward bend of about 45 degrees. A U-rail 13 is provided at the back of the rake plate 11, as seen in the rake travel direction (to the right in FIG. 3). The U-rail 13 is welded to the rake plate 11.

Figure 5:
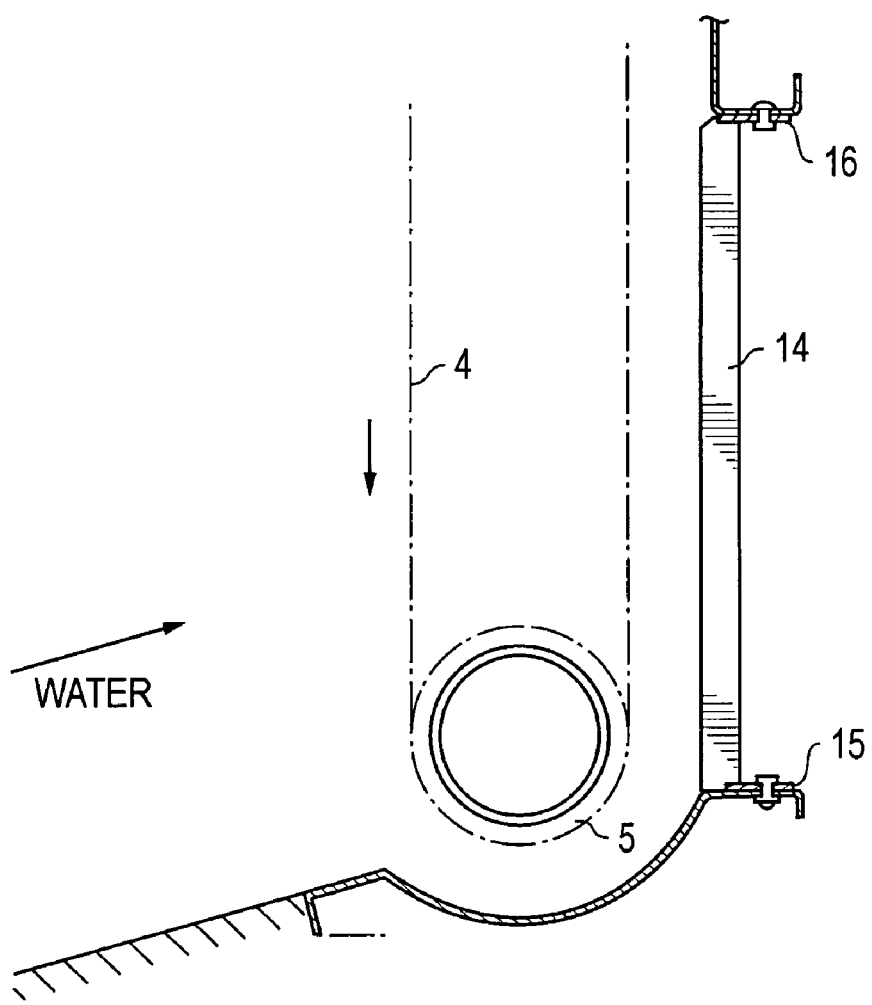
FIG. 5 is a side elevational view of a bottom portion of the bar screen assembly.
Figure 6:
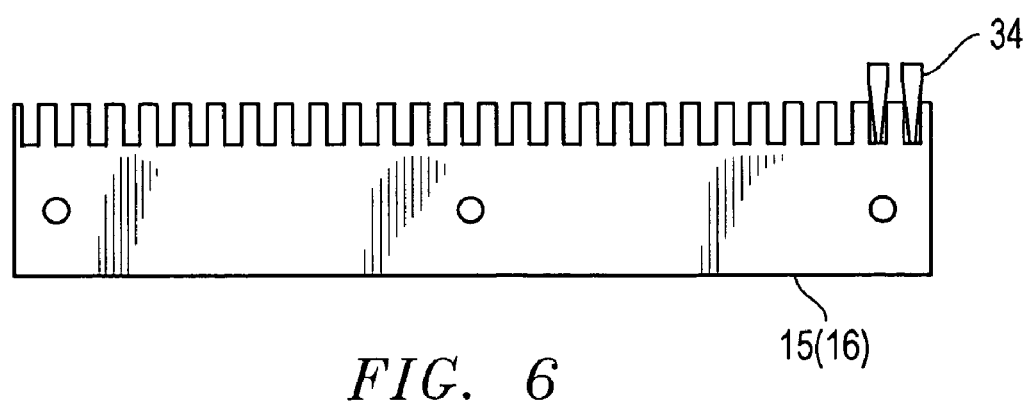
FIG. 6 is a top plan view of a holding plate for the vertical screen bars.
Figure 7:
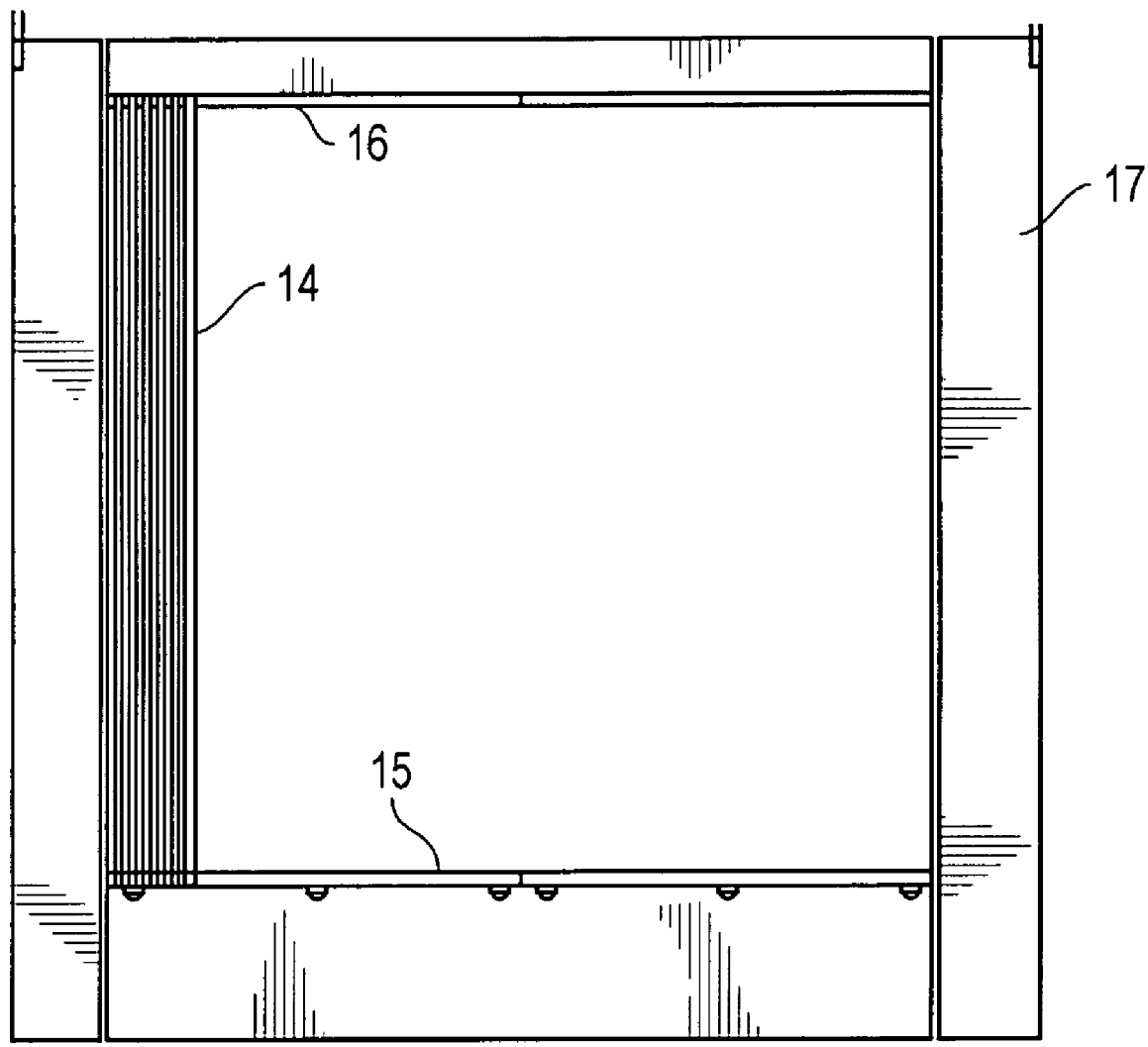
FIG. 7 is a front elevational view of the screen, illustrating only a few screen bars.

Referring now to FIGS. 5–7, the screen 2 comprises a multiplicity of vertical screen bars 14. The cross-section of the screen bars 14 may be, for example, trapezoidal, forming a leading edge that is approximately twice the width of the trailing edge, with reference to the water flow direction. Alternatively, the screen bars 14 may be provided with rectangular or still other cross-sectional shapes as well, such as a teardrop shape. The screen bars 14 are welded to a sole plate or bottom plate 15 and into an upper screening retention plate or top plate 16. The bottom and top plates are bolted to a screen frame 17. Depending on the width of the water channel, it is possible use several screen modules, which are formed by the plates 15, 16 and the screen bars 14. If the channel depth exceeds a given material limit with regard to the free length of the screen bars 14, it is possible to add horizontal reinforcement bars extending between the plates 15, 16.

As indicated by the downward arrow in FIG. 5, the chain 4 travels about the lower sprocket wheel 5 in a counter-clockwise direction. The travel speeds are approximately 0.11 m/s minimum speed, and 0.22 m/s maximum speed. The drive system 6 is preferably a 3-phase motor. The gear box, such as a helical worm gear unit may be used.

Figure 8:
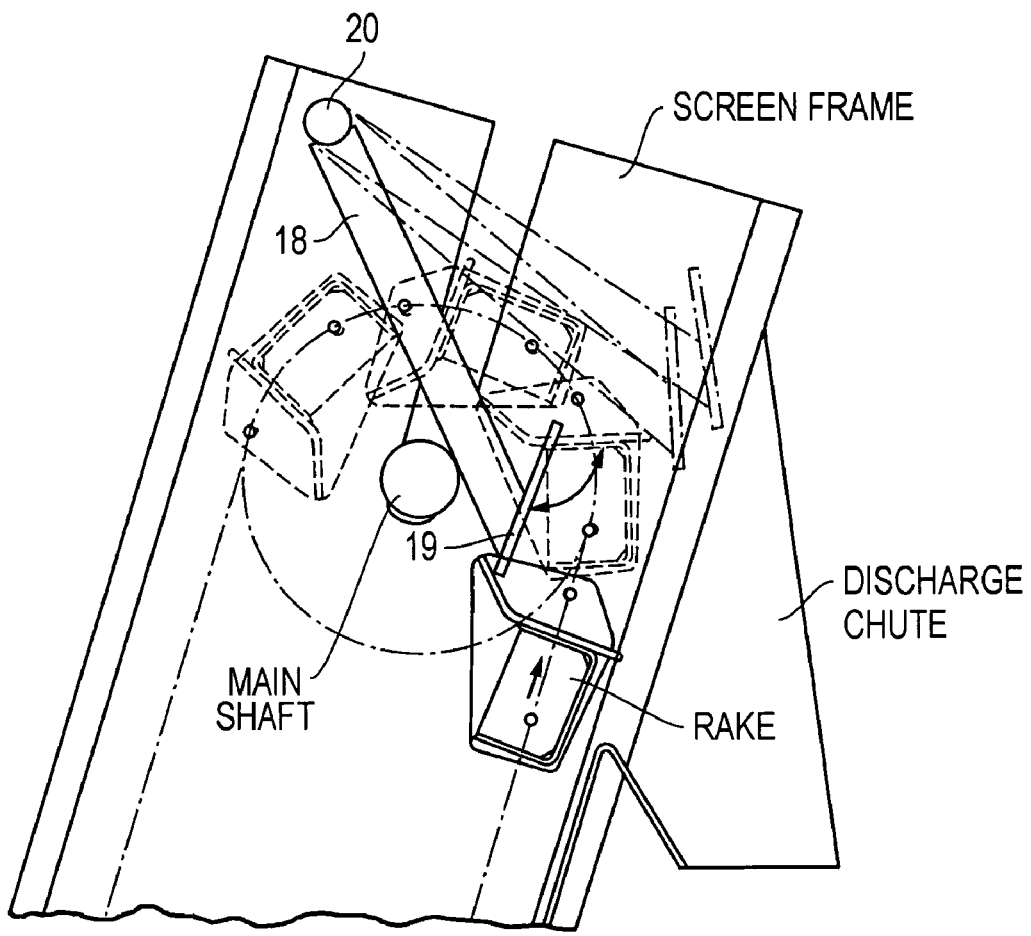
FIG. 8 is a diagrammatic side view of the top portion of the bar screen assembly, showing the scraper mechanism.

Referring now to FIG. 8, when the rake 3 reaches the height of the discharge chute 7, the screenings are scraped from the rake 3 by means of a scraper mechanism. The scraper mechanism comprises a pendulum arm 18 and a plunger plate 19. The pendulum arm 18 swivels freely in a bearing 20. By way of example, the frame 17 is preferably formed entirely from a 4 mm thick plate and is recessed to accommodate the scraping mechanism, chain guides and idler sprockets in order to maintain the full channel width through the plane of the screen.

The frame is accurately set into position into the necessary recesses in the channel walls and it is grouted securely into place. No fixing bolts are used. The screen may be set, for example, at 75 degrees relative to horizontal. The screen may be set at other angles as well. The frame is fully welded to the sole plate, the screen plane, and to the rear screenings retention plate. It is also fully welded to the head plate, the discharge chute, and the closure plate between the underside of the discharge chute and the top of the channel. At the upstream face of the screen assembly, box section cross members are securely welded to the side members or the frame at regular intervals between a point above the maximum top water level and the head of the screen. These cross members form the supports for non-illustrated removable transparent cover panels.

The upper section of the frame incorporates the screening's washwater spray bar and the necessary shrouding to eliminate the aerosol effect of the washwater system. In one embodiment, the bars are selected by the bar spacing from three different sizes. In another embodiment, the bars are approximately 25 mm deep and 5 mm thick for screens for water depths up to about 1500 mm. For water depths in excess of about 1500 mm, the screen bars are approximately 40 mm deep and 8 mm thick. In both cases the bars have a tapered cross section as illustrated. The bars extend from the sole plate, to which they may be individually welded or otherwise joined, such as with bolts and clips, to a point that is approximately 200 mm above maximum possible top water level. At that point they are individually joined or welded, for example, to the upper screening retention plate.

Intermediate stiffening supports are welded to the screen bars as necessary for screens to accommodate water depths in excess of about 2000 mm. These stiffening bars are of rectangular cross sections and they are oriented so as to present the minimum cross-sectional area against the flow in the channel. The screen bars shall be individually welded to each stiffening support. The bottom plate is profiled to induce screenings and debris in the lower level of the flow to be directed onto the lower portion of the screen bars and no to be accumulated at the foot of the screen. The leading edge of the sole plate is at the same level as the channel floor.

Raking bars and tines are formed from single continuous bars of sufficient depth to ensure complete stiffness across the full width of the bar. The bar has a minimum thickness of 8 mm and has tines of the appropriate profile to suit the screen bar spacings milled from the leading edge of the same. The raking bar tines penetrate to within 3 mm of the root of the screen bars and leaving a gap of 7 mm between the leading edge of the screen bars and to root of the raking tines. The tines form an angle of 5 degrees to the normal to the screen bars while engaged with the same, with the ends of the tines trailing the remainder of the raking bar. The raking bars are attached to the drive chains within the side members of the screen frame utilizing suitably fabricated links. The raking bars are accurately aligned to ensure that for the full width of each bar the tines penetrate the screen bars to the correct amount of the full extent of travel of the tines while engaged within the screen bars.

Stainless steel or polypropylene chain guides are securely fixed to the side members of the screen frame for the full height of travel of the chains. The guides are designed to ensure that the majority of the chains are kept out of contact with the main flow as far as possible, while giving sufficient clearance for the connecting links for each raking bar.

Idler sprockets are located at the lower end of each side member of the screen frame and have a minimum thickness of about 20 mm. A bush housing is contiguously welded on both faces to the sprocket. The sprockets are retained on their stub axles by a suitable, easily removable mechanism to ensure ease of replacement of the bearing if necessary. Alternatively, a turn-around guide may be used at the bottom of the assembly instead of sprockets. The turn-around guide may be formed from steel, plastic (e.g., HDPE), or other suitable materials. The drive shaft at the head of the screen frame has two chain sprockets mounted thereon generally as described above, but they are securely keyed to the shaft. The bearing for the shaft within the screen frame may be, for example, self-lubricating polypropylene. The bearing between the drive unit and the screen frame is a conventional roller ball-race type. The raking mechanism is designed to ensure that any part of the screen is cleaned at least once every five seconds.

The drive unit is suitably continuously rated and is selected to match the duty of the particular screen. The drive unit is directly coupled to the rake assembly drive shaft. A facility is incorporated within the drive mechanism mounting arrangement to enable the scraping mechanism drive chains to be correctly tensioned and the raking bars to be accurately positioned across the screen face. Such adjustments are possible without the dismantling of any part of the screen frame and without the necessity for any special tools.

A pressure and/or current sensing overload device with a built-in intelligent control facility is incorporated within the screen starter compartment in the motor control center. The device is capable of reverse the direction of travel of the scraping mechanism, should a blockage occur on the screen and cause the overload device to trip the normal operation of the screen rake. The device is also capable of enabling this reversing action to be affected for a maximum of, for example, five times for any one occurrence. Further, the device either resets automatically if the blockage causing the initial overload conditions is cleared, or, should the blockage remain upon the completion of the fifth attempt at automatic clearance of the same, the alarm is generated.

The scraper bar is fabricated and mounted so that it efficiently cleans the full width of each raking bar. The bearing for the scraper bar is self-lubricating polypropylene. For screens which are wider than about 2000 mm, the damping effect of the bearings are insufficient to permit the scraper bar to return to its rest position in a smooth, steady motion without inducing any shock into the mechanism and a purpose-made and efficient hydraulic damping unit is affixed to either end of the scraper bar shaft to ensure that the returning scraper bar does not suddenly drop back into its rest position.

The assembly may further incorporate a washwater spray bar in the head of the screen to aid the cleaning of the scraper bar/raking bar interaction and also to ensure that the maximum amount of organic material is returned to the main flow of sewage. The spray bar spans the full width of the screen and has individual nozzle jets set into its at least 150 mm centers. The jets produce a wide angle of spray in the same plane as that in which the spray bar lies and is aligned to maximize the washing of the screenings as they are scraped off each raking bar. Washwater is delivered to the spray bar at a pressure of 16 bar and at the rate of 2l/mm/nozzle. A solenoid valve is fitted to the washwater line feeding the spray bar to ensure that the flow to the screen is isolated when the rake assembly is not being operated. The washwater system should operate continuously during the operation of the rake assembly. A complete shroud may be fitted to the screen head to ensure that the aerosol effect of the spraying system is adequately contained. The discharge chute is set to guide all the screening removed by the rake assembly as efficiently as possible into the screening handling system. The chutes form an integral part of the screen assembly and also forms part of the washwater shrouding system.

Figure 9:
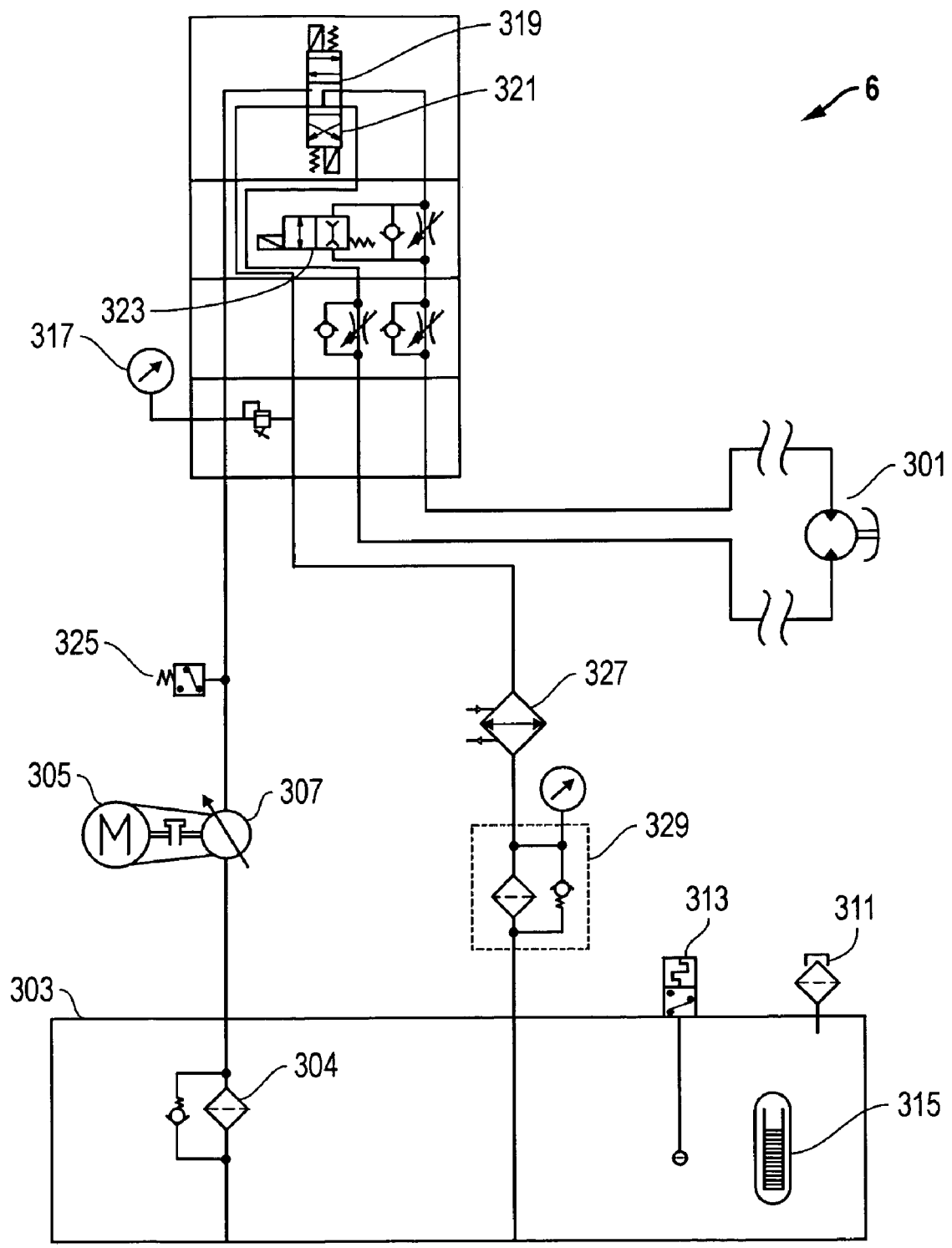
FIG. 9 is a schematic diagram of one embodiment of a hydraulic drive system for a fluid screening operation and is constructed in accordance with the present invention.
Figure 10:
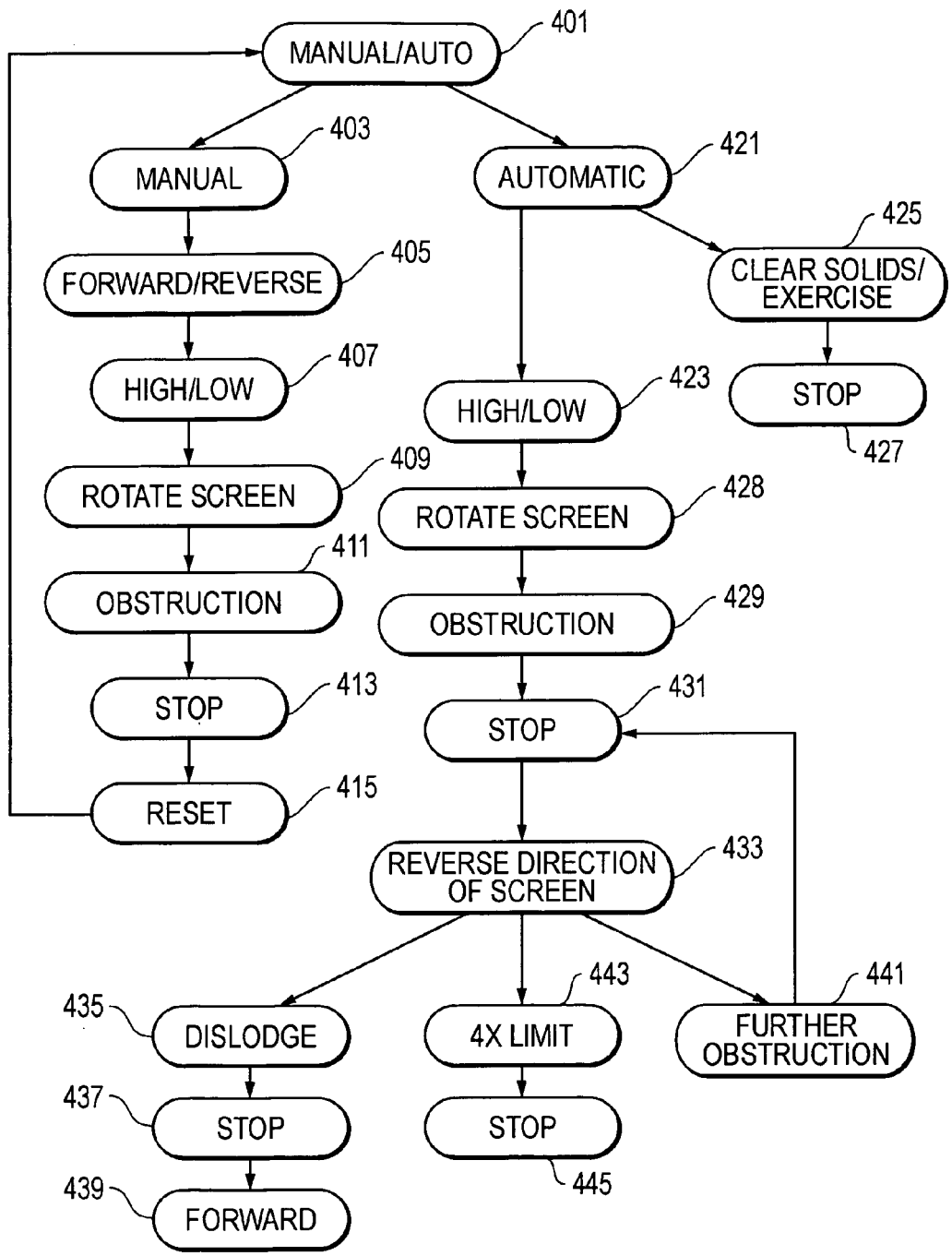
FIG. 10 is a flowchart of one embodiment of a method in accordance with the present invention.

Referring now to FIGS. 1, 9, and 10, one embodiment of the drive system 6 for driving the rake assembly utilizes a hydraulic motor 301 that is directly coupled to the drive shaft of the rake assembly. The hydraulic motor 301 and drive system 6 are sized to provide the torque required to drive the rake assembly throughout the desired speed range. In one embodiment, the hydraulic motor 301 is a variable displacement type that provides constant torque but allows variable speed operation in proportion to the amount of hydraulic oil flowing through the motor. The speed of the hydraulic motor 301 is approximately 16 rpm at high speed and 8 rpm at low speed.

The drive system 6 is also capable of providing additional torque as required to free lodged solids from the screen field. As will be described below, the drive system 6 also provides overload protection required when the lodged solids block the rotating rake bar. The drive system 6 operates up to a predetermined pressure value before the overload protection is activated. In addition, the drive system 6 allows the screen 2 to be completely submersed to permit installation into areas that would place the drive system 6 below the high water level in a structure.

In addition to the hydraulic motor 301, the drive system 6 comprises a hydraulic fluid reservoir 303 and an electric motor 305. In one embodiment, the reservoir 303 has a 15-gallon capacity, a suction strainer 304, a filler/breather 311, a temperature gauge 313 with a high temperature switch, and a fluid level gauge 315 with a low level switch. The electric motor 305 may comprise, for example, a 5 to 7.5 hp TEFC electric motor, depending on screen size and torque requirements. The drive system 6 also includes a variable displacement hydraulic pump 307 having load sensing control, a pressure gauge 317, a directional control valve 319 for directional control of the rake assembly, a solenoid-controlled flow control module 321 to control the low speed mode of the rake assembly, a pressure regulator 323 for the hydraulic circuit pressure, a pressure switch 325, and interconnecting hoses. The drive system 6 further comprises a hydraulic air-to-oil cooler 327 and a return filter 329.

In operation, the drive system 6 may be operated in either a manual mode or an automatic mode, as selected at an overall screen control panel, as depicted at step 401 (FIG. 10). In the manual operation mode 403, the drive system 6 operates in forward or reverse (step 405) when the hydraulic power unit has been energized with sufficient oil level at an acceptable oil temperature. The drive system 6 can be operated at a low (normal) speed or a high speed operating mode, as depicted at step 407. The rake assembly then rotates (step 409) in the selected direction at the selected speed. In the event that the rake assembly encounters an obstruction (step 411) that causes high discharge pressure, the drive system 6 stops immediately, as illustrated at step 413. In the manual operation mode, this condition must be manually acknowledged or reset (step 415) at the screen control panel by depressing a reset button. After resetting and clearing the obstruction, the drive system 6 can be restarted, as shown at step 401.

In the automatic operating mode (step 421), the hydraulic power unit must be similarly energized with sufficient oil level at an acceptable oil temperature. The drive system 6 runs forward at a selected speed mode (step 423) in response to a respective level input received at the screen control panel. In one embodiment, the drive system 6 will continue to run at the selected speed until such time as a different level input is received. Selection of the other level input causes the drive system 6 to shift to the other speed operating mode. In one embodiment, the drive system 6 will run in the high speed mode until the high level input is removed, at which time it slows to the low speed mode until that input is also removed. With no input (step 425), the rake assembly will operate for a brief time (i.e., adjustable off delay) to clear the solids remaining on the rakes, and then shut down (step 427). If the input level is not selected during an operator adjustable time period (also step 425), the screen will automatically start and run for an adjustable time period to exercise the system.

During operation (step 428), an obstruction on the screen may be encountered (step 429) while operating in either the high or low speed mode. The obstruction leads to high pressure, which stops the rake assembly (step 431), as described above. After an adjustable delay, the rake assembly begins rotating in reverse (step 433) in the low speed mode. Rotation continues for an adjustable time period to allow the rake bar to fully sweep the screen field to remove the solid(s) that caused the jam to occur. If the obstruction dislodges easily (i.e., no high pressure occurs in that hydraulic circuit) when the reversing rake makes contact (step 435), then, after an adjustable time period, the rake assembly stops (step 437) and then runs forward again (step 439). However, if the obstruction does not dislodge easily and obstructs the reverse motion of the rake assembly to cause high pressure (step 441), the rake assembly stops once again (step 431). After the adjustable time period, the rake assembly begins rotating back in the forward direction (step 433) in the appropriate speed mode. These forward/reverse cycles continue until, in one embodiment, four attempts (i.e., four high pressure conditions) have been made to clear the obstruction. On the fifth attempt (step 443), the drive system shuts down immediately (step 445). More or fewer attempts may be performed, depending on the application.

While the invention has been shown or described in only some of its forms, it should be apparent to those skilled in the art that it is not so limited, but is susceptible to various changes without departing from the scope of the invention. For example, one skilled in the art will recognize that pneumatic components may be substituted for the hydraulic components of the above-described system.

I claim:

1. A drive system for a fluid screening system, comprising:
   a rake assembly disposed on an endless chain that travels about wheels for cleaning a screen of the fluid screening system;
   a hydraulic system having a hydraulic motor coupled to at least one of the wheels, the hydraulic motor being sized to provide a torque required to drive the rake assembly throughout a desired speed range, and provide additional torque as required to free lodged solids from the screen, such that the hydraulic motor provides overload protection required when lodged solids block the rotating rake assembly of the fluid screening system; and
   a control system for operating the rake assembly and the hydraulic system, the control system having adjustable delays when changing a direction or a speed of the rake assembly.

2. The drive system of claim 1, wherein the control system operates the hydraulic motor up to a predetermined hydraulic pressure value before the overload protection is activated.

3. The drive system of claim 1, wherein the hydraulic motor is a variable displacement type that provides constant torque but allows variable speed operation in proportion to an amount of hydraulic fluid flowing through the hydraulic motor, and the control system having adjustable time periods of operation for different steps carried out by the rake assembly.

4. The drive system of claim 1, wherein the hydraulic system further comprises a hydraulic fluid reservoir, an electric motor, a suction strainer, a filler/breather, a temperature gauge with a high temperature switch, a fluid level gauge with a low level switch, a variable displacement hydraulic pump having load sensing control, a pressure gauge, a directional control valve for directional control of the rake assembly, a solenoid-controlled flow control module to control a low speed mode of the rake assembly, a pressure regulator for a hydraulic circuit pressure, a pressure switch, interconnecting hoses, a hydraulic air-to-oil cooler, and a return filter.

5. The drive system of claim 1, wherein the control system operates the drive system in either a manual mode or an automatic mode, the manual mode comprising manually switching a direction and speed of the rake assembly, and the automatic mode comprising automated directional and speed control of the rake assembly.

6. A method of driving a fluid screening system, comprising:
   (a) selecting a direction for driving a rake assembly;
   (b) selecting a speed of operation for the rake assembly;
   (c) moving the rake assembly in the selected direction at the selected speed with a hydraulic system;
   (d) encountering an obstruction with the rake assembly that causes a high hydraulic discharge pressure to exceed a predetermined hydraulic pressure value that is greater than the hydraulic system allows;
   (e) stopping the rake assembly;
   (g) clearing the obstruction by operating the rake assembly in an opposite direction at a low speed mode for an adjustable time period; and then
   (h) restarting the drive system in said direction after an adjustable delay.

7. The method of claim 6, further comprising operating the fluid screening system in an automatic mode that does not require manual intervention, and operating the rake assembly for adjustable time periods of operation.

8. The method of claim 6, wherein step (c) comprises continuing to run the rake assembly at the selected speed until such time as a different level input is received.

9. The method of claim 6, further comprising operating the fluid screening system with no input, such that the rake assembly operates for a brief time to clear the obstruction, and then shuts down.

10. The method of claim 6, further comprising not selecting an input level during an adjustable time period, and automatically starting and running the rake assembly for an adjustable time period to exercise the fluid screening system.

11. The method of claim 6, wherein, if no excessive pressure is required to dislodge the obstruction in the opposite direction, then, after an adjustable time period, stopping the rake assembly and running the rake assembly in an original direction.

12. The method of claim 6, wherein, if excessive torque is required to dislodge the obstruction in the opposite direction, stopping the rake assembly once again and, after the adjustable time period, moving the rake assembly in an original direction.

13. The method of claim 12, repeating reversal of the direction of the rake assembly for several iterations to attempt to clear the obstruction, and, after a selected maximum number of attempts, shutting down the fluid screening system.

14. A drive system for a fluid screening system, comprising:
- a rake assembly disposed on an endless chain that travels about wheels for cleaning a screen of the fluid screening system;
- a hydraulic system having a hydraulic motor coupled to at least one of the wheels, the hydraulic motor being sized to provide a torque required to drive the rake assembly throughout a desired speed range, and provide additional torque as required to free lodged solids from the screen, such that the hydraulic motor provides overload protection required when lodged solids block the rotating rake assembly of the fluid screening system; and
- a control system for operating the rake assembly and the hydraulic system in an automatic mode comprising automated directional and speed control of the rake assembly, the control system having adjustable delays when changing a direction or a speed of the rake assembly, and adjustable time periods of operation for different steps carried out by the rake assembly.

15. A drive system according to claim 14, wherein the hydraulic system further comprises a hydraulic fluid reservoir, an electric motor, a suction strainer, a filler/breather, a temperature gauge with a high temperature switch, a fluid level gauge with a low level switch, a variable displacement hydraulic pump having load sensing control, a pressure gauge, a directional control valve for directional control of the rake assembly, a solenoid-controlled flow control module to control a low speed mode of the rake assembly, a pressure regulator for a hydraulic circuit pressure, a pressure switch, interconnecting hoses, a hydraulic air-to-oil cooler, and a return filter.

* * * * *